(12) United States Patent
Isobe et al.

(10) Patent No.: US 6,599,357 B1
(45) Date of Patent: Jul. 29, 2003

(54) DETOXIFYING AGENT FOR USE IN DISPOSAL OF NOXIOUS WASTES THAT IS CONDUCTED BY SOLIDIFYING THEM WITH CEMENT

(75) Inventors: Toshiyuki Isobe, Fukuoka (JP); Kunio Sasada, Ichinomiya-Machi (JP); Shuichi Sugihara, Tokyo-To (JP)

(73) Assignee: With Gala Co., Ltd., Kumamoto-Ken (JP)

( * ) Notice: Subject to any disclaimer, the term of this patent is extended or adjusted under 35 U.S.C. 154(b) by 0 days.

(21) Appl. No.: 09/869,391

(22) PCT Filed: Nov. 22, 2000

(86) PCT No.: PCT/JP00/08237

§ 371 (c)(1),
(2), (4) Date: Jun. 27, 2001

(87) PCT Pub. No.: WO01/38251

PCT Pub. Date: May 31, 2001

(30) Foreign Application Priority Data

Nov. 22, 1999 (JP) ............................................. 11-331553

(51) Int. Cl.$^7$ ............................................... C04B 22/12
(52) U.S. Cl. ........................ 106/697; 588/252; 588/256; 588/257
(58) Field of Search ................................ 106/697, 734; 588/252, 256, 257

(56) References Cited

U.S. PATENT DOCUMENTS

| | | | |
|---|---|---|---|
| 4,209,335 A | 6/1980 | Katayama et al. ............. | 106/89 |
| 5,007,965 A | 4/1991 | Sasae et al. ................. | 106/800 |
| 5,387,740 A | 2/1995 | Sasae et al. ................. | 588/257 |

FOREIGN PATENT DOCUMENTS

| | | |
|---|---|---|
| EP | 0818219 | 1/1998 |
| JP | 5514827 | 4/1980 |
| JP | 687637 | 3/1994 |
| JP | 748156 | 2/1995 |
| JP | 09208280 | 8/1997 |
| JP | 9278504 | 10/1997 |
| JP | 1024276 | 1/1998 |

OTHER PUBLICATIONS

N. Kovalev, et al. "Use of Regenerated Ion–Exchange Resins for Control of the Setting Times of Cement" Chemical Abstract, vol 105, No 2, (1986) No. 10953P.
Patent Abstracts of Japan Publication No. 09–278504 dated Oct. 28, 1997.
Patent Abstracts of Japan Publication No. 10–024276 dated Jan. 27, 1998.
Patent Abstracts of Japan Publication No. 06–087637 dated Mar. 29, 1994.
Patent Abstracts of Japan Publication No. 07–048156 dated Feb. 21, 1995.

*Primary Examiner*—Paul Marcantoni
(74) *Attorney, Agent, or Firm*—Ladas & Parry

(57) ABSTRACT

A detoxifying agent for use in disposal of noxious wastes that is conducted by solidifying them with cement, consisting essentially of an aqueous solution which comprises as main components (a) small-sized metal cations whose 6-coordination ionic radii are less than 100 pm, (b) medium-sized metal cations whose 6-coordination ionic radii are between 100 pm and 140 pm, and (c) large-sized metal cations whose 6-coordination ionic radii are in excess of 140 pm. This detoxifying agent can provide cement-solidified materials having high strength, substantially free from exudation of toxic substances such as heavy metals, PCBs and dioxins.

17 Claims, No Drawings

DETOXIFYING AGENT FOR USE IN DISPOSAL OF NOXIOUS WASTES THAT IS CONDUCTED BY SOLIDIFYING THEM WITH CEMENT

BACKGROUND OF THE INVENTION

1. Field of the Invention

The present invention relates to a detoxifying agent that is used when noxious wastes are treated with cement to solidify them. More particularly, the present invention relates to a detoxifying agent for use in disposal of noxious wastes, capable of providing cement-solidified materials having high strength, substantially free from exudation of toxic substances such as heavy metals, PCBs and dioxins.

2. Background Art

How to finally dispose of noxious wastes such as residues from the incineration of refuse, component (especially, molten slag and heavy metals) from the incineration of hazardous industrial wastes, polluted soil, river sludge, sewage sludge, waste glass and waste tires is now a serious social problem. These noxious wastes can discharge a variety of toxic substances, and, of these toxic substances, heavy metals, PCBs, dioxins, etc., in particular, are known to exert serious effects on ecosystem. For this reason, there has been strongly demanded a technique of finally disposing of noxious wastes without discharging the above toxic substances.

To meet the above demand, there have been proposed various methods for making noxious wastes innoxious, and subjecting them to recycling. One of these methods proposed is as follows: noxious waste containing the above-described toxic substances is mixed with cement, and the mixture is solidified to enclose the toxic substances in the cement; the cement-solidified material thus obtained is then subjected to recycling. However, the toxic substances tend to inhibit the agglomeration of cements, so that they retard the hardening of cement, and impart decreased strength to the cement-solidified material. Another problem is that the toxic substances enclosed in cement can ooze out of the cement-solidified material.

To solve these problems, the following method has been proposed as disclosed in Japanese Patent Laid-Open Publication No. 24276/1998: a solution containing, as main components, tannin and wood vinegar is diluted with water, and this aqueous solution is added as a detoxifying agent to noxious waste containing such toxic substances as heavy metals and PCBs to detoxify them. It is considered that, since tannin and wood vinegar exert a powerful chelating action on elemental compounds such as heavy metals, the detoxification of heavy metals and the like can successfully be attained by this method. However, although cement-solidified materials obtained by this method show strength to some degree, a further improvement in the strength has been expected.

SUMMARY OF THE INVENTION

An object of the present invention is to provide a detoxifying agent that is used when noxious wastes are treated with cement to solidify them, and that can provide cement-solidified materials having high strength, substantially free from exudation of toxic substances such as heavy metals, PCBS and dioxins.

The present invention provides a detoxifying agent for use in disposal of noxious wastes that is conducted by solidifying them with cement, consisting essentially of an aqueous solution which comprises as main components (a) small-sized metal cations whose 6-coordination ion radii are less than 100 pm, (b) medium-sized metal cations whose 6-coordination ionic radii are between 100 pm and 140 pm, and (c) large-sized metal cations whose 6-coordination ionic radii are in excess of 140 pm. The present invention also provides cement-solidified materials that can be obtained through the use of the above-described detoxifying agent.

DETAILED DESCRIPTION OF THE INVENTION

The detoxifying agent according to the present invention, for use in disposal of noxious wastes that is conducted by solidifying them with cement will be described hereinafter.

Detoxifying Agent

In the present invention, the "detoxifying agent" is an additive that is used when noxious wastes are treated with cement to solidify them. The purposes of this agent are to detoxify toxic substances contained in noxious wastes, thereby enclosing the detoxified substances in cement without discharging them, and to prevent toxic substances from exerting their effect of inhibiting the setting of cement, thereby obtaining cement-solidified materials having increased strength.

In the present invention, the "treatment with cement for solidification" is conducted for the purpose of disposing of noxious wastes. This treatment is useful in enclosing, in cement, such toxic substances as heavy metals, PCBs and dioxins contained in noxious wastes, thereby obtaining recyclable cement-solidified materials.

The "noxious wastes" that can be disposed of by the present invention include a variety of wastes that can discharge toxic substances such as heavy metals, dioxins and PCBs, and there is no particular limitation on them. Examples of such noxious wastes include residues from the incineration of refuse, component (especially, molten slag and heavy metals) from the incineration of hazardous industrial wastes, polluted soil, river sludge, and sewage sludge. In addition, waste glass, tires, plastics and CD, and the like are also included in the noxious wastes.

As mentioned previously, even if the above-described noxious wastes are treated with cement and solidified, toxic substances enclosed in the cement can ooze out of the cement-solidified materials. Moreover, since the toxic substances have the effect of inhibiting the setting of cement, the hardening of cement is retarded, and the resulting cement-solidified materials are to have decreased strength.

We found that it is possible to make the degree of exudation of toxic substances extremely low, and, at the same time, to obtain cement-solidified materials having increased strength if a detoxifying agent having a specific composition is used when noxious wastes are treated with cement to solidify them.

A detoxifying agent according to the present invention consists essentially of an aqueous solution comprising as main components (a) small-sized metal cations whose 6-coordination ionic radii are less than 100 pm, (b) medium-sized metal cations whose 6-coordination ionic radii are from 100 to 140 pm, and (c) large-sized metal cations whose 6-coordination ionic radii are more than 140 pm.

The "6-coordination ionic radii" herein mean ionic radii where the coordination number is 6, and refer to the generally known values that were determined by Shannon and Prewitt on the basis of observed values, and improved by Shannon. These ion radii (CR: crystal ionic radii) are enumerated on pages 725–726 of "Kaitei Yon-han, Kagaku Binran, Kiso-hen II (Handbook of Chemistry, Basic Section II, Fourth Revised Edition)", edited by The Chemical Society of Japan, published by Maruzen Co., Ltd., Japan.

The 6-coordination ionic radii of major ions useful for the present invention are as follows:

(a) as small-sized metal cations: $Li^+$: 90 pm, $Mg^{2+}$: 86 pm, $Mn^{2+}$: 81 pm, 97 pm, $Fe^{3+}$: 69 pm, 79 pm, $Ni^{2+}$: 83 pm;

(b) as medium-sized metal cations: $Na^+$: 116 pm, $Ca^{2+}$: 114 pm, $Sr^{2+}$: 132 pm; and (c) as large-sized metal cations: $Ba^{2+}$: 149 pm, $K^+$: 152 pm, $Rb^+$: 166 pm.

In addition, examples of halide anions include $Cl^-$ and $Br^-$, and their ionic radii are 167 pm and 182 pm, respectively. Regarding the above-described ionic radii of $Mn^{2+}$ and $Fe^{3+}$, the former value shows the radius of the ion that is in the low spin state, and the latter one shows the radius of the ion that is in the high spin state.

It is considered that, since metal cations selected from each of the three groups of ions that are different in the range of ionic radii are incorporated into the detoxifying agent of the present invention, the detoxifying agent can exert various detoxifying actions, such as a coagulating effect, on a wide variety of toxic substances. In the solidification of noxious wastes with cement, various toxic substances are considered to exist, and even if only a few of these toxic substances have the effect of inhibiting the setting of cement, it is unavoidable that the hardening of cement is adversely effected. Therefore, to incorporate, into the detoxifying agent, metal cations selected from each of the above-described groups (a), (b) and (c), which are different in the range of ionic radii, is considered to be quite effective in making the detoxifying agent useful for the detoxification of a wide variety of toxic substances.

(a) Small-Sized Metal Cations

Small-sized metal cations for use in the present invention are metal cations whose 6-coordination ionic radii are less than 100 pm. Preferably, the small-sized metal cations include at least one ion selected from alkali metal ions, alkaline-earth metal ions and 3d transition metal ions. More preferably, the metal cations include ions selected from each one of these three groups. It is considered that, since two or more different types of ions are thus allowed to exist in the detoxifying agent, a wider variety of toxic substances can be detoxified. The "3d transition metals" herein refer to the transition metals with atomic numbers of 21 (Sc) to 29 (Cu), having an unfilled 3d shell; this transition metal series is also called the elements of the first transition series.

There is no particular limitation on the small-sized metal cations for use in the present invention. Preferable examples of the metal cations include $Li^+$, $Mg^{2+}$, $Mn^{2+}$, $Fe^{3+}$ and $Ni^{2+}$, and it is most preferable to use all of these ions as the small-sized metal cations. It is preferable that these metal cations be supplied to the aqueous solution in the form of halides. It is more preferable that the metal cations such be supplied to the aqueous solution in the form of, for instance, lithium chloride, magnesiumchloride, manganese (II) chloride, iron (III) chloride, and nickel (II) chloride. This is because, since these halides are strong electrolytes, they are completely ionized in the solution.

(b) Medium-Sized Metal Cations

Metal cations of any type can be used as the medium-sized metal cations for use in the present invention as long as their ionic radii fall in the range of 100 to 140 pm. The medium-sized metal cations preferably include at least one ion selected from alkali metal ions and alkaline-earth metal ions, more preferably ions selected from both of these two groups. It is considered that, since two or more types of ions are thus allowed to exist in the detoxifying agent, the detoxification of a wider variety of toxic substances can successfully be attained.

Specific examples of the medium-sized metal cations that can preferably be used in the present invention include $Na^+$, $Ca^{2+}$ and $Sr^{2+}$, and it is most preferable to use all of these ions. It is preferable that these metal cations such be supplied to the aqueous solution in the form of halides. It is more preferable that the metal cations such be supplied to the aqueous solution in the form of, for example, sodium chloride, calcium chloride and strontium chloride. This is because, since these halides are strong electrolytes, they are completely ionized in the solution.

(c) Large-Sized Metal Cations

The large-sized metal cations for use in the present invention are those ones whose ionic radii are greater than 140 pm. Preferably, the large-sized metal cations include at least one ion selected from alkali metal ions and alkaline-earth metal ions. More preferably, the metal cations include ions selected from both of these two groups. It is considered that, since two or more types of ions are thus allowed to exist in the detoxifying agent, a wider variety of toxic substances can successfully be detoxified.

Specific examples of the large-sized metal cations that can preferably be used in the present invention include $Ba^{2+}$, $K^+$ and $Rb^+$, and it is most preferable to use all of these ions. It is preferable that these metal cations such be supplied to the aqueous solution in the form of halides. It is more preferable that the metal cations in the form of, for example, barium bromide, potassium chloride and rubidium chloride be supplied to the aqueous solution. This is because, since these halides are strong electrolytes, they are completely ionized in the solution.

In the detoxifying agent of the present invention, it is preferable to use, as the metal cations, alkali metal ions, alkaline-earth metal ions and 3d transition metal ions as described hereinbefore. The reason why ions of these three types are used is that these ions are geochemically important and stable in any environment over a long period of time. Alkali metal ions have strong salting-out power (show high bond strength with water), and tend to coagulate colloidal toxic substances, so that they are considered to act to detoxify toxic substances. Alkaline-earth metal ions form sparingly soluble salts, and have solidifying, hardening and adhering effects. They are therefore considered to act to detoxify toxic substances. 3d Transition metal ions form sparingly soluble salts or complexing salts, so that they are considered to have the effect of detoxifying toxic substances.

The detoxifying agent of the present invention thus comprises a variety of metal cations including ions whose ionic radii fall in at least three different ranges, the ions being preferably selected from each one of the three groups of alkali metal ions, alkaline-earth metal ions and 3d transition metal ions. The detoxifying agent of the invention can therefore harmoniously exert, on a variety of toxic substances, such effects as coagulating, dehydrating and complexing effects, and the effect of forming sparingly soluble compounds (precipitates). It is considered that, since these effects are synergistically exerted on various toxic substances, the toxic substances are detoxified more efficiently and completely.

Optional Components

In the present invention, various optional components may be incorporated into the detoxifying agent as needed within the scope of the invention.

It is noted that, since such components as tannin and wood vinegar can inhibit the hardening of cement as can be known from the results obtained in Example 2 and Comparative Example 2, it is desirable to incorporate substantially no tannin and wood vinegar into the detoxifying agent of the present invention.

Properties of Solution

There is no particular limitation on the condensation of each of the above-described metal ions in the detoxifying agent of the present invention, or on the ionic strength of the detoxifying agent. These two properties may be properly decided depending on the waste to be disposed of, or on the manner in which the detoxifying agent is used.

According to a preferred embodiment of the present invention, the detoxifying agent is prepared so that it will have an ionic strength of preferably 1 or more, more preferably 2 to 4. The detoxifying agent can more efficiently exert various effects such as a coagulating effect on toxic substances as long as it has an ionic strength in the above range.

According to a preferred embodiment of the present invention, the detoxifying agent is prepared so that its pH will fall in the range of 6 to 8. The detoxifying agent of the present invention having such a pH is advantageous in that it is nearly harmless to human body, is easy for handling and preservation, and can be a stable aqueous solution.

Preparation Method

The detoxifying agent of the present invention may be prepared by a method that is selected properly depending upon the types of components to be used, and there is no particular limitation on the production method. For example, in the case where alkali metal ions, alkaline-earth metal ions and 3d transition metal ions are used, the following method may be employed. Halides of alkali metals are firstly placed in a first vessel, while halides of alkaline-earth metals and those of 3d transition metals are placed in a second vessel. Hot water at about 90° C. or higher is poured into these vessels so that the ratio by volume of the quantity of the hot water in the first vessel to that of the hot water in the second vessel will be from 6:4 to 8:2, followed by stirring. The aqueous solution in the first vessel and that in the second vessel are then mixed. This mixture is stirred again, and cooled to room temperature to give a detoxifying agent of the present invention.

Usage

The detoxifying agent of the present invention is mixed with noxious waste to be disposed of, water and cement, and there is no particular limitation on the order of mixing.

According to a preferred embodiment of the present invention, the detoxifying agent is used in the following manner. After adding the detoxifying agent to noxious waste and agitating the mixture, cement is added to this mixture, and the resultant mixture is further agitated; a proper amount of water is then added to this mixture, and the mixture obtained is thoroughly agitated. When the detoxifying agent is used in this manner, the effects of the present invention can be obtained more efficiently.

Any type of cement including Portland cement, Portland blast furnace slag cement and fly ash cement can be used together with the detoxifying agent of the present invention. It is however preferable to use ordinary Portland cement since this cement shows sufficiently high initial strength, is economically advantageous, and is effective in obtaining cement-solidified materials that are stable in quality.

The detoxifying agent of the present invention is considered to function in the following way. The detoxifying agent exhibits its various effects as the hydration reaction of cement proceeds, and needle crystals are thus produced in pores of various sizes formed in the hardened cement. These needle crystals are crystals having no water unlike simple hydrates of cement, so that the hardened cement is to have a denser constitution. It is considered that, owing to this denser constitution, the hardened cement shows increased strength and durability, and becomes slow to undergo corrosion.

Cement-Solidified Material

The cement-solidified material obtained through the use of the detoxifying agent of the present invention is such that toxic substances contained in noxious waste have efficiently been detoxified due to the various effects of the detoxifying agent, such as the effect of forming sparingly soluble compounds (precipitates), and coagulating, hydrating and complexing effects. Therefore, the cement-solidified material exudes substantially no toxic substances, and is excellent in both strength and durability.

It is preferable to reuse the cement-solidified materials as durable materials. Preferable examples of durable materials include secondary products of concrete such as interlocks, flat plates, concrete curbs, car stops, and tetrapod. Thus, it becomes possible to recycle noxious wastes efficiently and safely.

EXAMPLES

The detoxifying agent of the present invention will now be explained more specifically by referring to the following examples. However, these examples are not intended to limit or restrict the scope of the present invention in any way.

Example 1 & Comparative Example 1

Cement-solidified materials were produced by using and without using a detoxifying agent of the present invention, and compared with each other in terms of compressive strength and the degree of exudation of toxic substances.

Example 1

A detoxifying agent of the present invention was prepared by using the following compounds.

| (A) Halides of alkali metals: | |
|---|---|
| Sodium chloride | 60 g |
| Potassium chloride | 30 g |
| Rubidium chloride | 10 g |
| (B) Halides of alkaline earth metals: | |
| Magnesium chloride | 15 g |
| Calcium chloride | 10 g |
| Strontium chloride | 7.5 g |
| Barium bromide | 3 g |
| (C) Halides of 3d transition metals | |
| Manganese (II) chloride | 1.5 g |
| Iron (III) chloride | 1.5 g |
| Nickel (II) chloride | 5 g |

The above-listed halides of alkali metals (A) were placed in a vessel I, and the halides of alkaline earth metals (B) and those of 3d transition metal elements (C) were placed in a vessel II. Hot water at about 90° C. or higher was poured into the vessel I in an amount of 700 ml, and into the vessel II in an amount of 300 ml, and the mixture in each vessel was stirred quickly. The mixture in the vessel I and that in the vessel II were transferred to an other vessel III at the same time, and the mixture obtained was stirred again. This mixture was cooled in the air at room temperatures to give a detoxifying agent of the present invention.

Six parts by volume of the above-prepared detoxifying agent was added to 40 parts by volume of river sludge. To this mixture was added 30 parts by volume of river sand as fine aggregate, and the mixture obtained was agitated quickly. 30parts by volume of Portland cement and a proper amount of water were further added to the above mixture, and the mixture was agitated again. Samples for use in the following tests were made in this manner.

After the cement was hardened, the samples were cured for 7 days and for 28 days in the wet air, and a compressive strength test was conducted in accordance with JIS A5201 (Physical Testing Methods of Cement, 1992). The results are shown in Table 1.

In addition, after curing the above-obtained sample for 28 days in the air, an exudation test was carried out in accordance with Notification No.13 of the Environment Agency, Japan to measure the concentrations of toxic heavy metals in a liquid exuded from the sample. For reference, the concentrations of toxic heavy metals in the river sludge itself (original sludge) were also measured. The results are shown in Table 2.

Comparative Example 1

River sludge was solidified with cement in the same manner as in Example 1 except that the detoxifying agent of the present invention was not added, and the samples obtained were subjected to the same compressive strength test as in Example 1. The results are shown in Table 1.

TABLE 1

| | Compressive Strength (kgf/cm$^2$) | |
|---|---|---|
| | After 7 days | After 28 days |
| Example 1 | 45.0 | 51.44 |
| Comparative Example 1 | 9.7 | 31.17 |

TABLE 2

| Toxic Subtance | Concentration in Original Sludge (mg/kg) | Concentration in Liquid Exuded from Cement-Solidified Material (mg/l) |
|---|---|---|
| Cadmium | 8.5 | less than 0.01 |
| Lead | 292 | 0.01 |
| Chromium (VI) | less than 2 | less than 0.05 |
| Arsenic | 87.7 | less than 0.01 |
| PCB | less than 0.01 | less than 0.0005 |

The data shown in Tables 1 and 2 demonstrate the following: In the case where the detoxifying agent of the present invention is used when river sludge containing organic impurities is solidified with cement, the resulting cement-solidified material shows sufficiently high compressive strength. With respect to the exudation of toxic substances, only extremely small amounts of toxic substances are found to have exuded from the cement-solidified material, so that it is confirmed that the cement-solidified material is substantially free from exudation of toxic substances. Further, the concentrations of the toxic substances in the liquid exuded from the cement-solidified material fulfil the criteria set for the disposal of industrial wastes.

Example 2, Comparative Examples 2 & 3

Cement-solidified materials were produced by using the detoxifying agent of the present invention, by using a conventional detoxifying agent, and without using any detoxifying agent, and subjected to a strength test.

Example 2

Water, cement (ordinary Portland cement), fine aggregate (land sand from Futtsu, Chiba-ken, Japan), and the detoxifying agent prepared in Example 1 were mixed in accordance with the formulation shown in Table 3. This cement mixture was cured in the air under the conditions of 28° C. and 78 RH %. 7, 14and28days after the mixing, the compressive strength of the cement mixture was measured by the same method as in Example 1. The results are shown in Table 3.

Comparative Example 2

A cement mixture was prepared in accordance with the formulation shown in Table 3 in the same manner as in Example 2. It is noted that the detoxifying agent used in this example is a conventional agent containing tannin and wood vinegar as its main components. This cement mixture was cured, and then subjected to the measurement of compressive strength in the same manner as in Example 2. The results are shown in Table 3.

Note that the above conventional detoxifying agent is an aqueous solution prepared by dissolving the following compounds in one litter of hot water.

| | |
|---|---|
| Tannin | 2 g |
| Wood vinegar | 3 g |
| Sodium chloride | 83.3 g |
| Potassium chloride | 125.3 g |
| Potassium bromide | 9 g |
| Lithium chloride | 2.4 g |
| Barium chloride | 18 g |
| Calcium sulfate | 12 g |
| Magnesium chloride | 12 g |
| Strontium chloride | 6 g |
| Cobalt chloride | 12 g |
| Copper chloride | 6 g |
| Zinc chloride | 6 g |

Comparative Example 3

A cement mixture was prepared in accordance with the formulation shown in Table 3 in the same manner as in Example 2. It is noted that any detoxifying agent was not used in this example. This cement mixture was cured, and then subjected to the measurement of compressive strength in the same manner as in Example 2. The results are shown in Table 3.

TABLE 3

|  |  | Example 2 | Comp. Ex. 2 | Comp. Ex. 3 |
|---|---|---|---|---|
| Quantity | Detoxifying agent | 60.5 | — | — |
|  | Conventional detoxifying agent | — | 67.5 | — |
|  | Water | 284 | 284 | 338 |
|  | Cement | 520 | 520 | 520 |
|  | Sand | 1040 | 1040 | 1040 |
| Strength | After 7 days | 242 | 178 | 198 |
|  | After 14 days | 287 | 218 | 236 |
|  | After 28 days | 388 | 306 | 321 |

*Quantity: (g); Strength: (kgf/cm$^2$)

The data shown in Table 3 demonstrate the following:

(1) The cement mixture prepared by using the detoxifying agent of the present invention is superior to the cement mixture prepared by using the conventional detoxifying agent in the strength measured after the 7-day curing. The cement-solidified material of the present invention can therefore be subjected to bulk transportation relatively early after its production.

(2) The cement mixture prepared by using the detoxifying agent of the present invention is largely superior to the cement mixture prepared by using the conventional detoxifying agent also in the strength measured after the 28-day curing. It is therefore considered that the cement-solidified material of the present invention can be used over a prolonged period of time for those applications where high strength is required. The reason why the cement mixture prepared by using the conventional detoxifying agent (Comparative Example 2) is, on the whole, inferior in strength to the cement mixture prepared without using any detoxifying agent (Comparative Example 3) is that tannin and wood vinegar inhibit the hardening of cement.

As mentioned above, when the detoxifying agent according to the present invention is used, cement-solidified materials having high strength, substantially free from exudation of toxic substances can be obtained. This means that it becomes possible to prevent environmental pollution, and to effectively reuse noxious wastes as cement-solidified materials when the detoxifying agent of the invention is used.

What is claimed is:

1. A detoxifying agent for use in disposal of noxious wastes that is conducted by solidifying them with cement, consisting essentially of an aqueous solution which comprises as main components:

(a) small-sized metal cations whose 6-coordination ionic radii are less than 100 pm, comprising alkaline-earth metal ions and 3d transition metal ions;

(b) medium-sized metal cations whose 6-coordination ionic radii are between 100 pm and 140 pm, comprising alkali metal ions and alkaline-earth metal ions; and (c) large-sized metal cations whose 6-coordination ionic radii are in excess of 140 pm, comprising alkali metal ions and alkaline-earth metal ions; and wherein the detoxifying agent comprises substantially no tannin or wood vinegar.

2. The detoxifying agent according to claim 1, wherein each of the metal cations (a), (b) and (c) includes at least one ion selected from the group consisting of alkali metal ions, alkaline earth metal ions and 3d transition metal ions.

3. The detoxifying agent according to claim 1, wherein the metal cations (a), (b) and (c) are supplied to the aqueous solution in the form of halides.

4. The detoxifying agent according to claim 1, having an ionic strength of 1 or more.

5. The detoxifying agent according to claim 4, having an ionic strength of 2 to 4.

6. The detoxifying agent according to claim 1, wherein the small-sized metal cations include at least one ion selected from the group consisting of Li$^+$, Mg$^{2+}$, Mn$^{2+}$, Fe$^{3+}$ and Ni$^{2+}$.

7. The detoxifying agent according to claim 6, wherein the small-sized metal cations include all of the ions Li$^+$, Mg$^{2+}$, Mn$^{2+}$, Fe$^{3+}$ and Ni$^{2+}$.

8. The detoxifying agent according to claim 1, wherein the medium-sized metal cations include at least one ion selected from the group consisting of Na$^+$, Ca$^{2+}$ and Sr$^{2+}$.

9. The detoxifying agent according to claim 8, wherein the medium-sized metal cations include all of the ions Na$^+$, Ca$^{2+}$ and Sr$^{2+}$.

10. The detoxifying agent according to claim 1, wherein the large-sized metal cations include at least one ion selected from the group consisting of Ba$^{2+}$, K$^+$ and Rb$^+$.

11. The detoxifying agent according to claim 10, wherein the large-sized metal cations include all of the ions Ba$^{2+}$, K$^+$ and Rb$^+$.

12. The detoxifying agent according to claim 1, having a pH of 6 to 8.

13. A cement-solidified material obtained through the use of a detoxifying agent according to claim 1.

14. The detoxifying agent according to claim 2, wherein the metal cations (a), (b) and (c) are supplied to the aqueous solution in the form of halides.

15. The detoxifying agent according to claim 2, having an ionic strength of 1 or more.

16. The detoxifying agent according to claim 3, having an ionic strength of 1 or more.

17. The detoxifying agent according to claim 1, wherein the small-sized metal cations include alkali metal ions, alkaline-earth metal ions and 3d transition metal ions.

* * * * *

UNITED STATES PATENT AND TRADEMARK OFFICE
CERTIFICATE OF CORRECTION

PATENT NO.   : 6,599,357 B1                                                                     Page 1 of 1
DATED        : July 29, 2003
INVENTOR(S)  : Toshiyuki Isobe et al.

It is certified that error appears in the above-identified patent and that said Letters Patent is hereby corrected as shown below:

<u>Title page,</u>
Item [73], Assignee, "Gala" should read -- Gaia --.

Signed and Sealed this

Ninth Day of December, 2003

JAMES E. ROGAN
*Director of the United States Patent and Trademark Office*